United States Patent
Kim et al.

(10) Patent No.: US 10,673,177 B2
(45) Date of Patent: Jun. 2, 2020

(54) ELECTRIC DEVICE TERMINAL APPARATUS AND METHOD FOR MANUFACTURING ELECTRIC DEVICE TERMINAL APPARATUS

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Jisung Kim, Yokkaichi (JP); Kazuo Nakashima, Yokkaichi (JP); Mitsuru Hirose, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 16/487,358

(22) PCT Filed: Feb. 20, 2018

(86) PCT No.: PCT/JP2018/005878
§ 371 (c)(1),
(2) Date: Aug. 20, 2019

(87) PCT Pub. No.: WO2018/163796
PCT Pub. Date: Sep. 13, 2018

(65) Prior Publication Data
US 2020/0059036 A1    Feb. 20, 2020

(30) Foreign Application Priority Data
Mar. 7, 2017    (JP) .................... 2017-043053

(51) Int. Cl.
| H01R 13/52 | (2006.01) |
| H02K 5/22 | (2006.01) |
| H01R 24/28 | (2011.01) |

(52) U.S. Cl.
CPC ......... H01R 13/5202 (2013.01); H02K 5/225 (2013.01); H01R 24/28 (2013.01); H01R 2201/26 (2013.01)

(58) Field of Classification Search
CPC .. H01R 24/28; H01R 13/5202; H01R 13/521; H01R 13/6215
See application file for complete search history.

(56) References Cited

U.S. PATENT DOCUMENTS 7,044,762 B1 * 5/2006 Hong ................. H01R 13/5213
  439/275
9,004,932 B2 * 4/2015 Inoue ................. H01R 13/5202
  439/271

(Continued)

FOREIGN PATENT DOCUMENTS

| JP | H10-159981 A | 6/1998 |
| JP | 2002-134129 A | 5/2002 |

(Continued)

OTHER PUBLICATIONS

Apr. 17, 2018 Interntationl Search Report issued in International Patent Application PCT/JP2018/005878.

*Primary Examiner* — Xuong M Chung Trans
(74) *Attorney, Agent, or Firm* — Oliff PLC

(57) ABSTRACT

An electric device terminal apparatus includes: a housing having a fitting portion that can fit together with a partner member; a storage groove provided in the periphery of the fitting portion, on an end surface of the housing that faces the partner member; and a ring-shaped seal member that is provided in the storage groove and water-tightly seals a (Continued)

space between the end surface of the housing and the partner member. The storage groove is filled with a liquid gasket as the seal member.

5 Claims, 2 Drawing Sheets

(56) References Cited

U.S. PATENT DOCUMENTS

| | | | |
|---|---|---|---|
| 9,337,571 B2* | 5/2016 | Furuya | H01R 13/5219 |
| 2001/0041470 A1* | 11/2001 | Makita | H01R 13/5219 |
| | | | 439/271 |
| 2004/0214464 A1 | 10/2004 | Fukushima et al. | |
| 2011/0217859 A1* | 9/2011 | Kimura | H01R 13/52 |
| | | | 439/271 |
| 2012/0319513 A1 | 12/2012 | Okamoto et al. | |
| 2016/0226347 A1 | 8/2016 | Okamoto et al. | |
| 2016/0268743 A1 | 9/2016 | Oed et al. | |

FOREIGN PATENT DOCUMENTS

| | | |
|---|---|---|
| JP | 2006-183788 A | 7/2006 |
| JP | 2007-285401 A | 11/2007 |
| JP | 2008-041600 A | 2/2008 |
| JP | 2011-187224 A | 9/2011 |
| JP | 2016-536749 A | 11/2016 |

* cited by examiner

ELECTRIC DEVICE TERMINAL APPARATUS AND METHOD FOR MANUFACTURING ELECTRIC DEVICE TERMINAL APPARATUS

The aspects of disclosed embodiments relate to an electric device terminal apparatus and a method for manufacturing an electric device terminal apparatus.

BACKGROUND

With a vehicle such as an electric automobile or a hybrid automobile in recent years, various types of electric devices are electrically connected using a wire harness or the like (e.g., see JP 2011-187224A). FIG. 3 shows an example of a terminal block to which a connector of a wire harness is connected. The terminal block 1 is, for example, attached to an electric device mounted in the vehicle.

Multiple male pin terminals 2 are arranged on the terminal block 1. Also, when the connector of the wire harness is fit together with the terminal block 1, the male pin terminals 2 are fit into female pin terminals of the connector.

A ring-shaped rubber gasket 3 is attached as a seal member in the periphery of the male pin terminals 2. Support pieces 4 are integrally molded at several locations on the outer circumferential portion of the rubber gasket 3, and attachment holes 5 are formed on the support pieces 4.

Then, when fixing pins 6 that are formed on the terminal block 1 are inserted into attachment holes 5, the rubber gasket 3 is held on the terminal block 1, and thus the rubber gasket 3 is prevented from coming out of the terminal block during transportation or assembly of the electric device.

Also, when the connector is mounted in the terminal block 1, the rubber gasket 3 is held between the terminal block and the case edge of the connector and thus the water-tightness of the case of the connector is ensured.

SUMMARY

With the above-described terminal block 1, the fixing pins 6 are inserted into the supporting pieces 4 that are extended to the outer circumferential sides of the rubber gasket 3 in order to hold the rubber gasket 3. Accordingly, the fixing pins 6 need to be formed in the periphery of the rubber gasket 3, and therefore the outer diameter of the terminal block 1 and the outer dimension of the electric device to which the terminal block 1 is attached increase.

The disclosed embodiments have been made in view of such circumstances, and it is an object thereof to provide an electric device terminal apparatus that can achieve a smaller size.

An electric device terminal apparatus that solves the above-described problem includes: a housing having a fitting portion that can fit together with a partner member; a storage groove that is provided in the periphery of the fitting portion on an end surface of the housing that faces the partner member; and a ring-shaped seal member that is provided in the storage groove and water-tightly seals a space between the end surface of the housing and the partner member, wherein the storage groove is filled with a liquid gasket as the seal member.

According to this configuration, the space between the housing and the partner member is water-tightly sealed using the liquid gasket. Here, compared to the rubber gasket, the liquid gasket has a higher bonding property and a higher adhesiveness, and therefore the seal member can be fixed to the housing without providing a fixing structure such as a fixing pin. Accordingly, the electric device terminal apparatus can be made smaller.

Also, in the above-described electric terminal apparatus, it is preferable that unevenness is included on the bottom surface of the storage groove.

According to this configuration, the liquid gasket closely adheres to and engages with the unevenness of the bottom surface of the storage groove, and thus is held in the storage groove.

Also, in the above-described electric device terminal apparatus, it is preferable that a plurality of recessed streaks or a plurality of protruding streaks are formed continuously as the unevenness.

According to this configuration, the liquid gasket closely adheres to and engages with the plurality of recessed streaks and protruding streaks on the bottom surface of the storage groove, and thus is held in the storage groove.

Also, in the above-described electric terminal apparatus, it is preferable that a plurality of protrusions or a plurality of recesses are formed as the unevenness.

According to this configuration, the liquid gasket adheres to and engages with the plurality of protrusions or the plurality of recesses on the bottom surface of the storage groove, and thus is held in the storage groove.

In a method for manufacturing the electric device terminal apparatus that solves the above-described problem, it is preferable that, on an end surface of a housing having a fitting portion that can fit together with a partner member, the end surface facing the partner member, a ring-shaped storage groove is provided in the periphery of the fitting portion, the storage groove is filled with a liquid gasket, and a surface of the liquid gasket is hardened by irradiating the surface with ultraviolet beams.

With this method, the surface of the liquid gasket that fills the storage groove of the housing is hardened.

According to the electric device terminal apparatus of the certain disclosed embodiments, it is possible to achieve a smaller size.

DRAWINGS

DETAILED DESCRIPTION

Hereinafter, an embodiment of an electric device terminal apparatus will be described with reference to the drawings. The electric device terminal apparatus is attached to a case of an electric device, such as an inverter or a motor mounted in a vehicle such as an electric automobile or a hybrid automobile, and is used as part of a wire that electrically connects two electric devices. A motor (three-phase motor or the like) for travel driving in an electric automobile or the like and an inverter for driving the motor, an inverter for driving a motor and a battery for supplying power to the inverter, and the like are conceivable as combinations of two electric devices.

Figure 1:
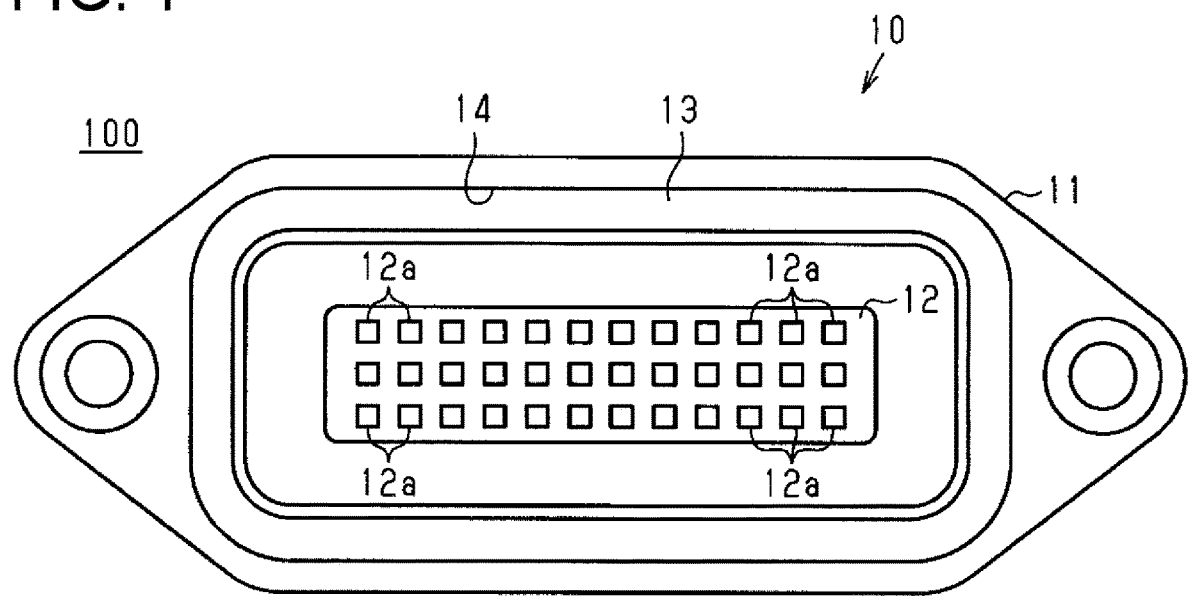
FIG. 1 is a perspective view showing an electric device terminal apparatus according to an embodiment.

As shown in FIG. 1, an electric device terminal apparatus 100 includes a terminal block 10 that is attached to a case (not shown) of an electrical device such as an inverter or a motor. A connector (not shown) such as a wire harness is connected to the terminal block 10.

The terminal block 10 includes: a housing 11; a terminal 12 (fitting portion) provided at the approximate central portion of the housing 11; and a seal member 13. The housing 11 is made of synthetic resin, for example.

Multiple male pin terminals 12a are provided on the terminal 12. The male pin terminals 12a are constituted by a conductive metal material such as aluminum or copper. The male pin terminals 12a are formed into rod shapes, for example. The male pin terminals 12a are fixed to the housing 11 in a state of passing through the housing 11 in the thickness direction. The male pin terminals 12a are formed so as to protrude toward the connector (partner member) with respect to an end surface 11a of the housing 11 that faces the connector. The multiple male pin terminals 12a are arranged separate from each other. The male pin terminals 12a are fit into the female terminals of the connector when the connector is fit together with the terminal block 10.

In the periphery of the terminal 12 on the end surface 11a of the housing 11, a storage groove 14 is formed into a ring shape so as to surround the terminal 12.

Figure 2:
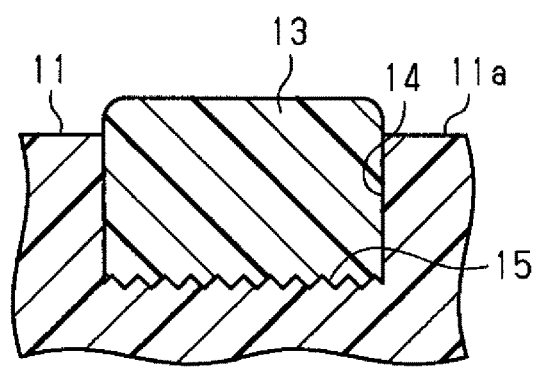
FIG. 2 is a cross-sectional view showing the electric device terminal apparatus.
Figure 3:
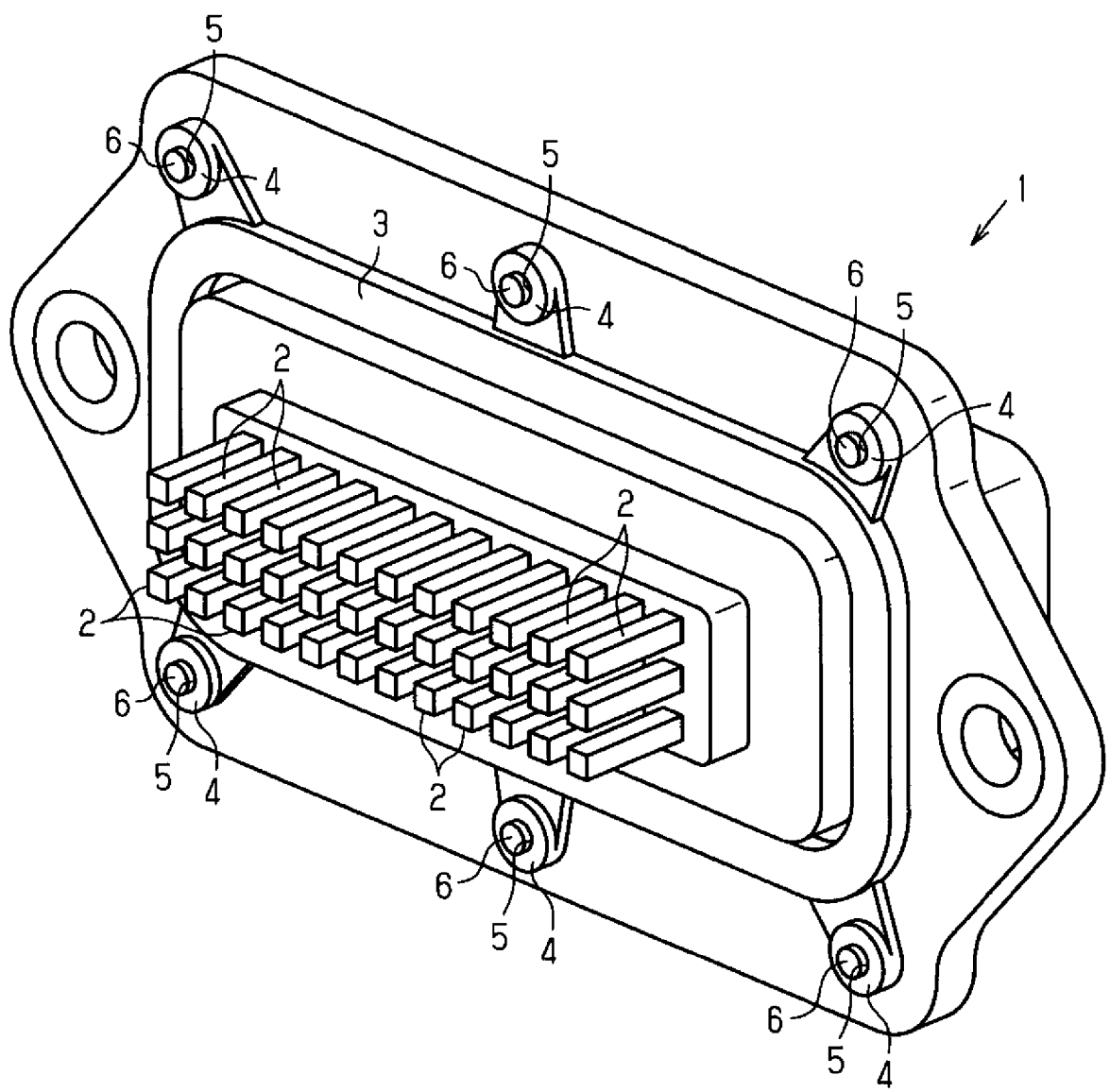
FIG. 3 is a perspective view showing a terminal block of a conventional example.

As shown in FIG. 2, the storage groove 14 is formed into a rectangular shape in cross-section, for example. Unevenness 15 is formed on the bottom surface of the storage groove 14. In the unevenness 15, for example, multiple protruding streaks and recessed streaks are formed continuously. The multiple protruding streaks and recessed streaks are formed so as to extend in a lengthwise direction (circumferential direction) of the storage groove 14, for example.

The seal member 13 is provided in the storage groove 14. The storage groove 14 is filled with a liquid gasket (cured-in-place gasket) as the seal member 13. Similarly to the storage groove 14, the seal member 13 is formed in a ring shape so as to surround the terminal 12 (see FIG. 1). The seal member 13 water-tightly seals (surface-seals) the space between the end surface 11a of the housing 11 and the connector (not shown), which is the partner member.

For example, filling is performed with the seal member 13 such that the seal member 13 bulges slightly in the opening direction (toward the connector) from the storage groove 14. The seal member 13 is bonded to the housing 11 inside of the storage groove 14. At this time, the unevenness 15 is formed on the bottom surface of the storage groove 14, and therefore the area of contact between the seal member 13 and the storage groove 14 (housing 11) is increased, and the seal member 13 is stably held in the storage groove 14.

The surface of the seal member 13 is solidified by being irradiated with ultraviolet beams. Accordingly, the adhesive force of the surface of the seal member 13 is reduced, whereby foreign substances are prevented from needlessly sticking to the surface of the seal member 13 during transportation or assembly work.

Next, a method for manufacturing the terminal block 10 constituted as described above will be described.

First, a housing 11 that includes the terminal 12 and is provided with the storage groove 14 is prepared. Next, the seal member 13 is formed by applying the liquid gasket in the storage groove 14 using a dispenser or the like. At this time, the liquid gasket has a high bonding property and high adhesiveness compared to a conventional gasket such as a rubber gasket, and therefore the seal member 13 favorably bonds to the storage groove 14 (housing 11). Accordingly, the seal member 13 can be fixed to the housing 11 without providing the housing 11 with a fixing pin or the like for fixing the seal member 13 to the housing 11.

Next, the surface of the seal member 13 is irradiated with ultraviolet beams to harden the surface of the seal member 13. Accordingly, the adhesiveness of the surface of the seal member 13 can be reduced.

When the connector (not shown) is attached to the terminal block 10 manufactured in this manner, the ring-shaped seal member 13 is held by the joined portion between the end surface of the terminal block 10 and the case edge of the connector, whereby the water-tightness of the case of the connector is ensured.

Also, the male pin terminals 12a are fit into the female pin terminals of the connector, and thus the electric device to which the terminal block 10 is attached is connected to another electric device via the wire harness.

With the above-described electric device terminal apparatus 100, the effects shown below can be obtained.

(1) When a connector such as a wire harness is fit together with the terminal block 10, the male pin terminals 12a of the terminal block 10 and the female pin terminals of the connector are fit together in the case of the connector, whereby electrical connection is achieved. Then, the edge of the connector can closely adhere to the seal member 13, ensuring water-tightness of the case of the connector.

(2) The storage groove 14 provided on the end surface 11a of the housing 11 is filled with the liquid gasket to form the seal member 13. Accordingly, since the seal member 13 can be bonded to the housing 11, the terminal block 10 no longer needs to be provided with fixing pins for holding the seal member 13 in the housing 11 on the outer circumferential side of the storage groove 14. Accordingly, the terminal block 10 can be reduced in size, and the shape of the terminal block 10 can be simplified.

(3) Since the terminal block 10 can be reduced in size, the electric device to which the terminal block 10 is attached and the connector attached to the terminal block 10 can be reduced in size.

(4) Due to forming the unevenness 15 on the bottom surface of the storage groove 14, the seal member 13 can be stably held in the storage groove 14.

(5) By emitting ultraviolet beams to the surface of the seal member 13 (liquid gasket) filling the storage groove 14, the surface of the seal member 13 can be hardened, and foreign substances can be prevented from needlessly sticking thereto.

(6) In a reference example of attaching an O-ring, which is a common seal member, to the storage groove 14, the elastic returning force of the O-ring is used to restrict the O-ring from falling out of the housing 11. That is, in order to generate the elastic returning force, the O-ring is attached to the storage groove 14 in an elastically-deformed state. The elastically-deformed state is a cause of deterioration of the O-ring, and thus the service life of the O-ring is shortened in some cases. On the other hand, in a preferred example, when the storage groove 14 is filled with the liquid gasket, the liquid gasket matches the shape of the storage groove 14 due to the fluidity of the liquid gasket. The seal member 13 is formed by hardening the liquid gasket in the storage groove 14. The seal member 13 is arranged in the storage groove 14 in a natural state, that is, in a substantially non-elastically-deformed state, and bonds to the inner surface of the storage groove 14 through a chemical bonding force. Accordingly, the seal member 13 has an excellent length of service life compared to a common seal member such as an O-ring.

(7) Through a chemical bonding force, the seal member 13 formed by the liquid gasket can bond to the entire inner surface (e.g., the side surfaces, the bottom surface, and the corner portions between the side surfaces and the bottom surface) of the storage groove 14, which has a rectangular cross-section as shown in FIG. 2. Due to the bonding between the seal member 13 and the inner surface of the storage groove 14, the seal member 13 is restricted from coming out of the housing 11.

(8) In a reference example in which an O-ring, which is a common seal member, is attached to the storage groove 14, tensile stress and compressive stress are applied to the O-ring when the O-ring is attached. The tensile stress and the compressive stress are factors that cause deterioration of the O-ring, and shorten the service life of the O-ring in some cases. On the other hand, in the embodiment, the seal member 13 is formed by hardening the liquid gasket in the storage groove 14. When the seal member 13 is arranged in the storage groove 14, substantially no tensile stress or compressive stress acts on the seal member 13. Accordingly, usage of the liquid gasket in the formation of the seal member 13 can contribute to extending the service life of the seal member 13.

Note that the above-described embodiment may also be modified as follows.

In the unevenness 15 of the bottom surface of the storage groove 14, for example, multiple protrusions or multiple recessions may also be formed continuously, instead of recessed streaks and protruding streaks. The protrusions or recesses may also be formed in hemispherical shapes, for example.

The seal member 13 composed of the liquid gasket may also be attached to the bonding surface between the connector and a terminal block including various terminals other than the male pin terminals or the female pin terminals.

In the above-described embodiment, the water-tightness of the joining portion between the end surface of the connector and the terminal block 10 is ensured by providing a seal member 13 in the periphery of the terminal 12 of the terminal block 10. There is no limitation this, and for example, the seal member 13 may also be formed so as to ensure the water-tightness of the joining portion between the terminal block and the case (partner member) of the electric device such as the motor or inverter. In this case, for example, the storage groove is formed on the end surface of the housing 11 facing the case (i.e., the end surface on the side opposite to the end surface 11a), and a seal member 13 composed of a liquid gasket is provided in the storage groove.

The storage groove 14 of the embodiment is called a loop-shaped groove formed on the end surface 11a in some cases. The terminal 12 of the embodiment is called a terminal array composed of multiple terminals (male and/or female) 12a in some cases. The liquid gasket of the embodiment has fluidity when the storage groove 14 is filled with the liquid gasket. The hardened liquid gasket, that is, the seal member 13 in the storage groove 14 can be a rubber-like elastic body in a non-elastically-deformed state. The seal member 13 of the embodiment is referred to in some cases as a loop-shaped water-proof seal member that bonds to the inner surface, and preferably the entire inner surface (side surfaces and bottom surface) of the storage groove 14 through a chemical bonding force.

The present disclosure encompasses the following working examples. Reference numerals for the constituent elements of the embodiment have been added not as limitations, but as support for comprehension.

Several working examples provide a terminal block (10) that is mounted in the electric device. The terminal block (10) includes: an end surface (11a); a loop-shaped groove (14) formed on the end surface (11a); a terminal array (12) that is composed of multiple terminals (12a) surrounded by the loop-shaped groove (14); and a loop-shaped water-proof seal member (13) that bonds to the entire inner surface of the loop-shaped groove (14) through a chemical bonding force.

In several working examples, the groove (14) is a groove with a rectangular cross-section that has a pair of side surfaces on opposite sides to each other, and a bottom surface joining the pair of side surfaces, and the water-proof seal member (13) bonds to the pair of side surfaces and the entire bottom surface of the groove (14) through the chemical bonding force.

In several working examples, the groove (14) has a corner portion between at least one of the pair of side surfaces and the bottom surface, and the water-proof seal member (13) bonds to the corner portion of the groove (14) through the chemical bonding force.

In several working examples, the groove (14) has a roughened bottom surface, and the water-proof seal member (13) bonds to the roughened bottom surface of the groove (14) through the chemical bonding force.

In several working examples, the water-proof seal member (13) is arranged in the groove (14) in a non-elastically-deformed state.

It should be evident to a person skilled in the art that the present invention may also be realized in other particular forms without departing from the technical idea. For example, some of the components described in the embodiment (or one or more modes) may also be omitted, and several components may also be combined. The scope of the present embodiment is to be established along with the entire range of equivalents to which the claims are entitled, with reference to the accompanying claims.

LIST OF REFERENCE NUMERALS

10 Terminal block
11 Housing
11a End surface
12 Terminal (fitting portion)
12a Male pin terminal
13 Seal member (liquid gasket, seal)
14 Storage groove
15 Unevenness

The invention claimed is:

1. An electric device terminal apparatus comprising:
   a housing having a fitting portion that can fit together with a connector of a wire harness, which is a partner member, and an end surface that faces a case edge of the connector of the wire harness;
   a storage groove that is provided in the periphery of the fitting portion on the end surface of the housing; and
   a ring-shaped seal that is provided in the storage groove and water-tightly seals a space between the end surface of the housing and the case edge of the connector of the wire harness,
   wherein the seal member is a liquid gasket filled in the storage groove and configured so as to closely adhere to the case edge of the connector of the wire harness.

2. The electric device terminal apparatus according to claim 1,
   wherein unevenness is included on the bottom surface of the storage groove.

3. The electric device terminal apparatus according to claim 2,
 wherein a plurality of recessed streaks and protruding streaks are formed continuously as the unevenness.

4. The electric device terminal apparatus according to claim 2,
 wherein a plurality of protrusions or a plurality of recesses are formed as the unevenness.

5. A method for manufacturing an electric device terminal apparatus, the method comprising the steps of:
 providing a housing with an end surface having a fitting portion that can fit together with a connector of a wire harness, which is a partner member, and the end surface facing a case edge of the connector of the wire harness,
 providing a ring-shaped storage groove is in the periphery of the fitting portion,
 filling the storage groove with a liquid gasket, and
 hardening a surface of the liquid gasket by irradiating the surface with ultraviolet beams to form a ring-shaped seal that water-tightly seals a space between the end surface of the housing and the case edge of the connector of the wire harness, the ring-shaped seal closely adhering to the case edge of the connector of the wire harness.

* * * * *